US012786201B2

(12) United States Patent
Mi

(10) Patent No.: US 12,786,201 B2
(45) Date of Patent: Nov. 3, 2026

(54) METHOD AND TERMINAL FOR APPLYING FOR AUTHORIZATION DURATION, COMPUTER EQUIPMENT AND STORAGE MEDIUM

(71) Applicant: Samsung Electronics Co., Ltd., Suwon-si (KR)

(72) Inventor: Deng Mi, Jiangsu Province (CN)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 18/597,348

(22) Filed: Mar. 6, 2024

(65) Prior Publication Data

US 2024/0323197 A1 Sep. 26, 2024

(30) Foreign Application Priority Data

Mar. 24, 2023 (CN) ........................ 202310301434.4

(51) Int. Cl.
*G06F 7/04* (2006.01)
*G06F 15/16* (2006.01)
(Continued)

(52) U.S. Cl.
CPC ........... *H04L 63/108* (2013.01); *H04W 92/18* (2013.01)

(58) Field of Classification Search
CPC ..................................................... H04L 63/108
(Continued)

(56) References Cited

U.S. PATENT DOCUMENTS 10,075,931 B2 9/2018 Jung et al.
10,313,867 B2 6/2019 Kuge et al.
(Continued)

FOREIGN PATENT DOCUMENTS

CN 106034279 A 10/2016
CN 107113915 A 8/2017
(Continued)

OTHER PUBLICATIONS

Chinese Notice of Allowance dated Sep. 1, 2025 for corresponding Chinese Application No. 202310301434.4.

*Primary Examiner* — Jeffrey C Pwu
*Assistant Examiner* — Samuel Ambaye
(74) *Attorney, Agent, or Firm* — Harness, Dickey & Pierce, P.L.C.

(57) ABSTRACT

A method and terminal of applying for an authorization duration, computer equipment and storage medium are provided in the present disclosure. The method of applying for the authorization duration, comprises: acquiring a plurality of authorization durations for a plurality of authorization services in response to service authorizations of the plurality of authorization services being received; determining a periodic timer duration for acquiring the plurality of authorization services at one time, based on a minimum or lowest authorization duration among the plurality of authorization durations and a timer duration for applying for authorization in advance, the timer duration for applying for authorization being set by a user; starting a periodic timer set based on the periodic timer duration; applying for a plurality of new authorization durations for the plurality of authorization services in response to a timeout of the periodic timer.

13 Claims, 5 Drawing Sheets

(51) Int. Cl.
*H04L 9/40* (2022.01)
*H04L 29/06* (2006.01)
*H04W 92/18* (2009.01)

(58) Field of Classification Search
USPC ............................................................. 726/4
See application file for complete search history.

(56) References Cited

U.S. PATENT DOCUMENTS

| | | | | |
|---|---|---|---|---|
| 10,499,222 | B2 | 12/2019 | Adachi et al. | |
| 10,986,678 | B2 | 4/2021 | Li et al. | |
| 2014/0295815 | A1* | 10/2014 | Cho ...................... | H04W 40/20<br>455/418 |
| 2018/0192280 | A1* | 7/2018 | Kuge .................... | H04W 8/005 |
| 2018/0332647 | A1* | 11/2018 | Li ....................... | H04W 56/001 |
| 2019/0028990 | A1 | 1/2019 | Sartori et al. | |
| 2020/0314955 | A1* | 10/2020 | Velev .................... | H04W 76/11 |

FOREIGN PATENT DOCUMENTS

| | | | |
|---|---|---|---|
| JP | 4136694 | B2 | 8/2008 |
| WO | 2019-095815 | A1 | 5/2019 |
| WO | WO-2019095128 | A1 | 5/2019 |
| WO | WO-2021138166 | A1 | 7/2021 |

* cited by examiner

METHOD AND TERMINAL FOR APPLYING FOR AUTHORIZATION DURATION, COMPUTER EQUIPMENT AND STORAGE MEDIUM

CROSS-REFERENCE TO RELATED APPLICATION

This application is based on and claims priority under 35 U.S.C. § 119 to Chinese Patent Application No. 202310301434.4, filed on Mar. 24, 2023, the disclosure of which is incorporated by reference herein in its entirety.

TECHNICAL FIELD

The present disclosure relates to a field of communication technology, in particular to a field of Device-to-Device (D2D) communication authorization technology, more specifically to a method and terminal of applying for an authorization duration, computer equipment and storage medium.

BACKGROUND

Device-to-Device (D2D) communication is a technology that allows direct discovery and direct communication between terminal devices, which have been introduced into LTE and 5G technologies. The D2D communication technology can increase a spectral efficiency of communication systems, reduce a transmission power of terminals, and solve a problem of lack of spectrum resources (e.g., reduce usage of spectrum resources) in a wireless communication system to some extent.

SUMMARY

Some example embodiments of the present disclosure provide a method and terminal of applying for an authorization duration, computer equipment, and storage medium.

According to an example embodiment of the present disclosure, a method of applying for an authorization duration is provided, which includes: acquiring a plurality of authorization durations for a plurality of authorization services when service authorizations of the plurality of authorization services are received; determining a periodic timer duration for acquiring the plurality of authorization services at one time, based on a minimum or lowest authorization duration among the plurality of authorization durations and a timer duration for applying for authorization in advance, the timer duration for applying for authorization in advance being set by a user; starting a periodic timer based on the periodic timer duration; applying for a plurality of new authorization durations for the plurality of authorization services in response to a timeout of the periodic timer.

According another example embodiment of the present disclosure, a terminal of applying for an authorization duration, which includes: at least one processor, and at least one memory storing computer executable instructions, wherein the processor in response to executing the computer executable instructions causes the terminal to acquire a plurality of authorization durations for a plurality of authorization services in response to service authorizations of the plurality of authorization services being received, determine a periodic timer duration for acquiring the plurality of authorization services at one time, based on a minimum or lowest authorization duration among the plurality of authorization durations and a timer duration for applying for authorization in advance, the timer duration for applying for authorization in advance being set by a user start a periodic timer set based on the periodic timer duration; an authorization application unit is configured to apply for a plurality of new authorization durations for the plurality of authorization services in response to a timeout of the periodic timer.

It should be understood that the above general description and the following detailed description are only illustrative and explanatory, and do not limit the present disclosure

BRIEF DESCRIPTION OF THE DRAWINGS

The accompanying drawings hereof are incorporated into and form a part of the specification, which show some example embodiments conforming to the present disclosure, and are used in conjunction with the specification to explain principles of the present disclosure and do not constitute an improper limitation of the present disclosure.

DETAILED DESCRIPTION OF EXAMPLE EMBODIMENTS

In order to enable those ordinary skilled in the art to better understand technical solutions of the present disclosure, the technical solutions in example embodiments of the present disclosure will be described clearly and completely in combination with the accompanying drawings.

Terms used here are for the purpose of describing a particular example embodiment and is not intended to be limitation. As used here, singular forms "a", "an", "the" and "this" are also intended to include plural forms, unless the context clearly indicates otherwise. In addition, terms "comprise" or "include" and/or variations thereof used in this specification indicate the existence of the stated features, whole, steps, operations, elements, components and/or groups thereof, but do not exclude the existence or addition of one or more other features, whole, steps, operations, elements, components and/or groups thereof. The example embodiments described in the following description do not represent all embodiments that are consistent with the present disclosure. Rather, they are only examples of apparatus and methods that are consistent with the present disclosure as detailed in the claims.

It should be noted here that "at least one of" appearing in the present disclosure means that there are three kinds of juxtaposition situations: "any one of these items", "combination of any number of these items", and "all of these items". For example, "including at least one of A and B" includes the following three juxtaposition situations: (1) including A; (2) including B; (3) including A and B. As another example, "performing at least one of step 1 and step 2", that is, means the following three juxtaposition situations: (1) performing step 1; (2) performing step 2; (3) performing steps 1 and 2.

According to some example embodiments of the present disclosure, a terminal described below may include at least one of a smart phone, a tablet personal computer (PC), a mobile phone, a video phone, an e-book reader, a desktop PC, a laptop PC, a netbook computer, a workstation, a server, a personal digital assistant (PDA), a portable multimedia players (PMP), a MP3 player, a mobile medical device, a camera, or a wearable device (such as, a smart watch, a smart bracelet, etc.) and so on, but not limited to this.

Some example embodiments according to the present disclosure are described below in combination with FIGS. 1 through 5.

Figure 1:
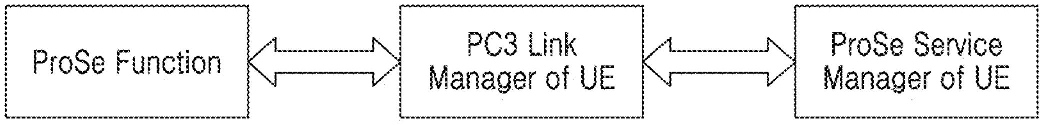
FIG. 1 illustrates an example of an application scenario according to some example embodiments of the present disclosure.

FIG. 1 illustrates an example of an application scenario according to some example embodiments of the present disclosure.

In the related art, D2D public safety direct connection services are mainly divided into two types: Proximity-based Service (ProSe) discovery and ProSe communication. ProSe discovery includes the following 8 types: Restricted ModelA Monitoring, Restricted ModelA Announcing, Restricted ModelB Discoverer, Restricted ModelB Discoveree, ModelA Monitoring, ModelA Announcing, ModelB Discoverer, ModelB Discoveree. ProSe communication includes two types: multicast communication and unicast communication.

Some example embodiments of the present disclosure may be applied to a service authorization scenario between a D2D terminal and a D2D server. According to some example embodiments of the present disclosure, under the D2D service authorization scenario, there are the following three modules: ProSe Function, PC3 Link Manager of User Equipment (UE), and ProSe Service Manager of UE. The ProSe Function is used to transmit an authorization response message to the UE. The PC3 Link Manager of UE is used for HTTP link establishment and signaling interaction between the UE and the ProSe Function. The ProSe Service Manager of UE is used to control a processing of authorization applications of the UE, for example, to maintain and manage timers related to an authorization duration. Specifically, when the terminal enables the ProSe discovery service and ProSe communication service, the terminal checks service authorization information, wherein all service authorization information is stored in the ProSe Function. The terminal transmits a MO request message to the ProSe Function when the terminal activates a service, and the ProSe Function transmits the MO response message to the terminal after the ProSe Function receives the MO request message, wherein the MO response message includes a plurality of authorization durations for a plurality of authorization services. For example, according to different service scenarios supported by the D2D, the ProSe Function transmits 10 authorization durations corresponding to authorization services of ProSe discovery and ProSe communication, to the terminal. Accordingly, authorization services may be services which require an authorization to complete or participate in. For each authorization service, there is one corresponding T4005 Timer to time an authorization duration. When an authorization duration of providing one certain authorization service exceeds the authorization duration corresponding to this service (for example, when a T4005 Timer corresponding to the service times out), the terminal stops providing this service. In this case, the terminal may apply for a new authorization duration to continue providing this service.

In related art, for the plurality of authorization services, the terminal may apply for authorization services many times based on the plurality of authorization durations to obtain a plurality of new authorization durations. For example, for 10 authorization services, the terminal needs to apply for a new authorization duration when each T4005 timer times out. These frequent authorization application operations will increase the number of interactions between the terminal and the ProSe Function, which may affect a corresponding service quality, for example, affecting the D2D service quality on a direct communication interface PC5 when the D2D service is busy.

In addition, due to a wide range of values of different authorization durations for different authorization services, for example, the T4005 timer may have a range of values of authorization durations between 1 min and 505600 min, it is necessary to set the plurality of different timers for different authorization durations, which increases complexity of the timers. It is necessary to use an appropriate algorithm to simplify the setting of the timers, to simplify implementation of the terminal and improve usability of terminal software.

It should be understood that the above application scenario is only used as an example and the example embodiments according to the present disclosure are not limited to the above application scenario.

Figure 2:
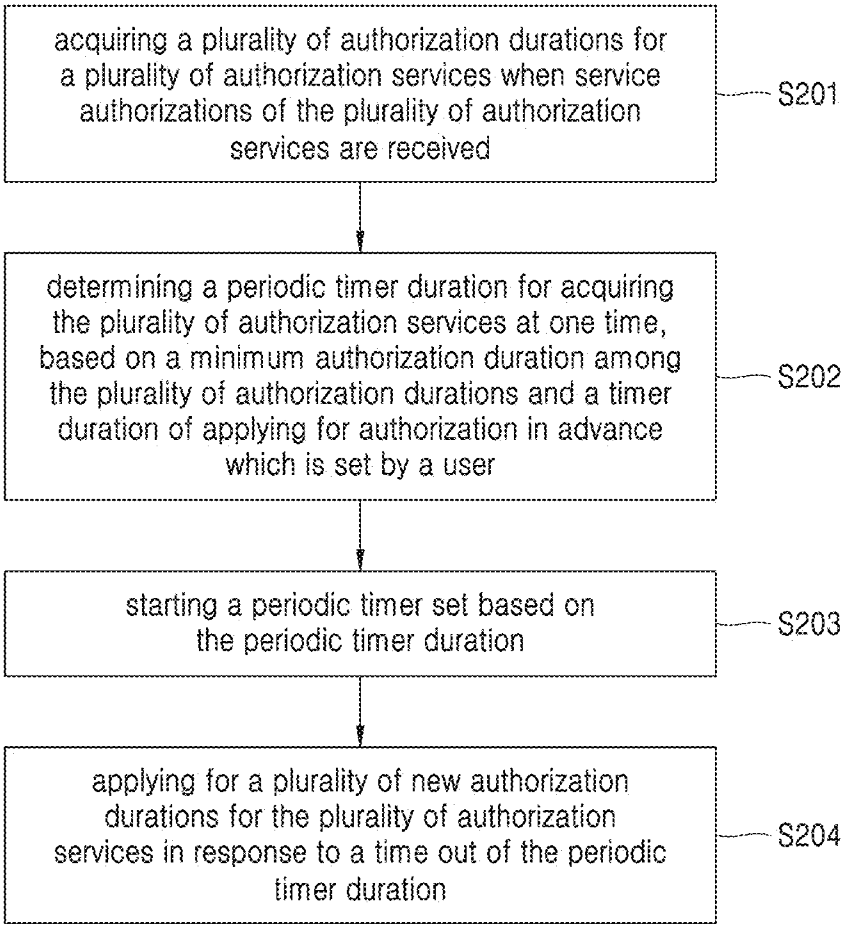
FIG. 2 illustrates a flowchart of a method of applying for an authorization duration according to some example embodiments of the present disclosure.
Figure 3:
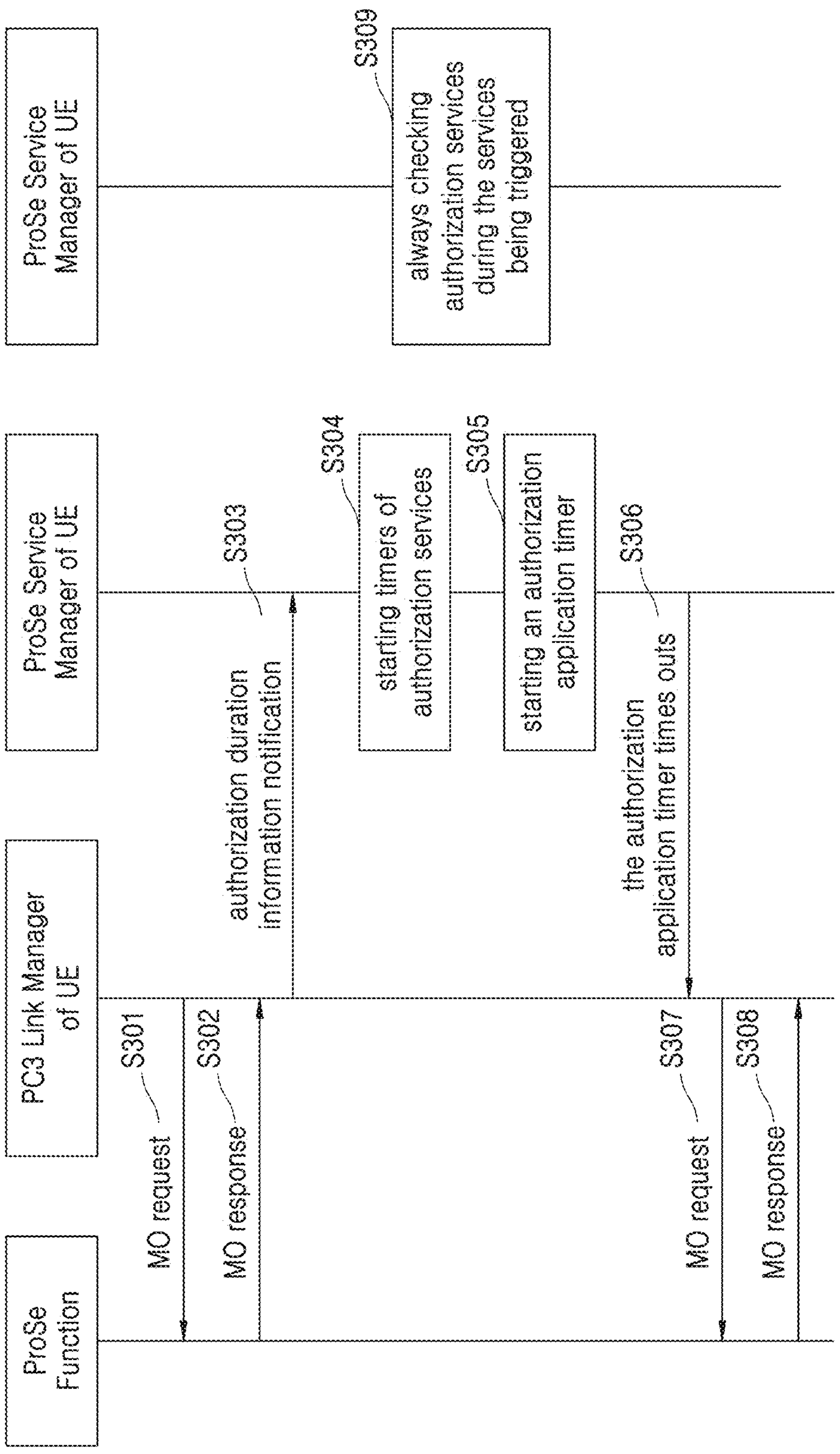
FIG. 3 illustrates a diagram of a signaling interaction of a method of applying for an authorization duration according to some example embodiments of the present disclosure.

FIG. 2 illustrates a flowchart of a method of applying for an authorization duration according to some example embodiments of the present disclosure. FIG. 3 illustrates a diagram of a signaling interaction of a method of applying for an authorization duration according to some example embodiments of the present disclosure. Steps in the method of applying for the authorization duration of FIG. 2 are described in conjunction with FIG. 3 in detail below.

Referring to FIG. 2, in step S201, a plurality of authorization durations for a plurality of authorization services are acquired when service authorizations of the plurality of authorization services are received. Alternatively, a plurality of authorization service timers corresponding to the plurality of authorization services are started while acquiring the plurality of authorization durations for the plurality of authorization services.

Referring to FIG. 3, in the above D2D service authorization scenario, when the terminal needs to enable a plurality of D2D authorization services, in step S301, the PC3 Link Manager of UE transmits a MO request message to the ProSe Function. In step S302, in response to receiving the MO request message, the ProSe Function transmits a MO response message to the PC3 Link Manager of UE, wherein the MO response message includes the plurality of authorization durations corresponding to the plurality of authorization services and other information related to the authorization services. In step S303, the PC3 Link Manager of UE notifies the authorization duration information to the ProSe Service Manager of UE. The UE (using a semiconductor chip, processor, transceiver, and/or other hardware elements) may perform an operation based on or included in the authorization services such as an audio call, a video call, a file transfer, or other D2D service. The operation may be performed during the authorization duration and may be performed based on the authorization duration.

Referring back to FIG. 2, in step S202, a periodic timer duration for acquiring the plurality of authorization services at one time is determined, based on a minimum authorization duration (or alternatively, lowest authorization duration, or lower authorization duration) among the plurality of authorization durations and a timer duration for applying for authorization in advance which is set by a user.

In other words, when there are the plurality of authorization durations, in addition to determining the timer durations for each authorization service, the periodic timer duration of the newly added periodic timer will be set based on the minimum authorization duration among the plurality of authorization durations and the timer duration for applying for authorization in advance which is set by the user, wherein, the newly added periodic timer is used to time the duration of applying for the plurality of new authorization durations of the plurality of authorization services at one time. In order to avoid a risk that may occur when the terminal applies for the new authorization durations in response to a timeout of the timer with the minimum authorization duration (for example, the terminal may fail to apply for the new authorization durations when the timer with the minimum authorization duration times out, resulting in service interruption, or the terminal may not obtain the new authorization durations in a poor network environment), the periodic timer duration smaller than the minimum authorization duration may be determined to ensure a continuous availability of the services provided by the terminal.

Here, the timer duration for applying for authorization in advance which is set by the user may be arbitrarily set by the user, for example, a timer duration for applying for authorization in advance which is input by the user, a timer duration for applying for authorization in advance which may be preset by the user or otherwise programmed, or a timer duration for applying for authorization in advance which may be determined by various other appropriate manners.

As such, using the periodic timer set based on the periodic timer duration smaller than the minimum authorization duration, the terminal may be timely notified of the need to apply for the new authorization durations before all the authorization duration timers time out or before all the authorization services expire.

Alternatively, the determining the periodic timer duration for acquiring the plurality of authorization services at one time, based on the minimum authorization duration among the plurality of authorization durations and the timer duration for applying for authorization in advance which is set by the user includes: setting the periodic timer duration to the timer duration for applying for authorization in advance which is set by the user, when the minimum authorization duration is greater than the timer duration for applying for authorization in advance which is set by the user; and setting the periodic timer duration to a duration that is less than the minimum authorization duration, determined based on a preset or desired time advance parameter, when the minimum authorization duration is less than or equal to the timer duration for applying for authorization in advance which is set by the user. Alternatively, the duration that is less than the minimum authorization duration, determined based on the preset or desired time advance parameter is a duration obtained by multiplying the preset or desired time advance parameter with the minimum authorization duration, wherein the preset or desired time advance parameter is a percentage greater than 0 and less than 1.

The determination of a periodic timer duration F(X) is described in detail below with the periodic timer duration F(X) as an example. It is assumed that the preset or desired value (that is, the timer duration for applying for authorization in advance which is set by the user) is X (in a unit of days), the periodic timer duration F(X) of a periodic timer is in a unit of milliseconds (ms), the minimum authorization duration is A (in a unit of minutes (min)), and the preset or desired time advance parameter is (1-K %), wherein it is assumed that K is an integer from 1 to 99, the timing duration F(X) may be determined by an equation (1):

$$F(X) = \begin{cases} X \times 20 \times 60 \times 60 \times 1000 & X < A/(24 \times 60) \\ A \times 60 \times 1000 \times (1 - K\ \%) & X \geq A/(24 \times 60) \end{cases} = \begin{cases} X \times 86400000 & X < A/1440 \\ A \times (1 - K\%) \times 60000 & X \geq A/1440 \end{cases} \quad (1)$$

According to the above equation (1), the timer duration X of applying for authorization in advance which is set by the user is set as the timing duration of the timer when the minimum authorization duration is greater than the timer duration for applying for authorization in advance which is set by the user, and when the minimum authorization duration is less than or equal to the timer duration for applying for authorization in advance which is set by the user, a result of multiplying the minimum authorization duration with a percentage greater than 0 and less than 1 is used as the periodic timer duration. As such, the new authorization durations may be requested in advance before the authorization service with the minimum authorization duration expires, to avoid the service interruption.

In step S203, the periodic timer set based on the periodic timer duration is started. Referring to FIG. 3, in step S304, the ProSe Service Manager of UE starts a plurality of timers for a plurality of authorization services set based on the plurality of authorization durations, to time the plurality of authorization services, and in step S305, the ProSe Service Manager of UE starts the periodic timer set based on the periodic timer duration determined by the above example, to time a time for authorization application. Here, steps S304 and S305 may be performed simultaneously.

Meanwhile, in step S309, the ProSe Service Manager of UE checks whether a service is within an authorization duration when this service is triggered (in other words, when a service request is received). Specifically, when whether the service is within the authorization duration is checked in the step S309, a timer corresponding to this service started in the step S304 is used to determine whether this service is within the authorization duration. In other words, the step S304 is mainly used to check whether the service is authorized in the step S309. If the timer corresponding to this service is started at the step S304, this service is considered to be authorized at the step S309, and the terminal may provide this service or the user may use this service.

Therefore, the method of applying for the authorization duration according to some example embodiments of the present disclosure further includes: starting timers, which are set based on the plurality of authorization durations respectively, corresponding to the plurality of authorization services while acquiring the plurality of authorization durations; using one or more timers corresponding to one or more services to check whether the one or more services are within the corresponding authorization durations when a service request for the one or more services is received.

Referring back to FIG. 2, in step S204, the plurality of new authorization durations for the plurality of authorization services are applied in response to a time out of the periodic timer duration. Referring to FIG. 3, in step S306, upon the timer used for authorization application times out, the ProSe Service Manager of UE informs the PC3 Link Manager of UE that the timer times out.

In order to avoid that the periodic timer duration of the periodic timer is too long, the number of the time out of the periodic timer may be counted. When the periodic timer times out and the number of the time out of the periodic timer meets a predetermined or desired condition, the plurality of new authorization durations for the plurality of authorization services may be applied. Alternatively, the applying for the plurality of new authorization durations for the plurality of authorization services in response to the time out of the periodic timer duration includes: setting a count value for the periodic timer according to the minimum authorization duration and the timer duration for applying for authorization in advance which is set by the user; deciding whether the periodic timer times out; determining whether the count value is equal to 1 in response to the time out of the periodic timer duration; applying for the plurality of new authorization durations for the plurality of authorization services when the count value is equal to 1; decreasing the count value by 1, restarting the periodic timer, and performing the deciding, when the count value is not equal to 1.

Figure 4:
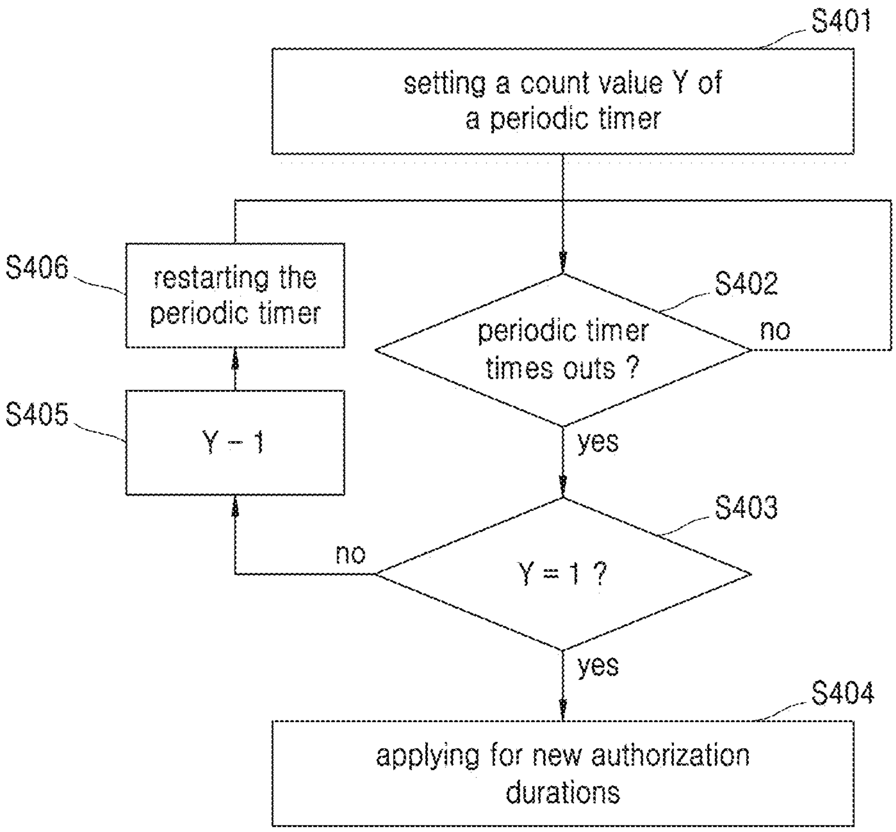
FIG. 4 illustrates a flowchart of authorization application processing of a timer according to some example embodiments of the present disclosure.

This is described in detail with reference to FIG. 4 below. FIG. 4 illustrates a flowchart of authorization application processing of a periodic timer according to some example embodiments of the present disclosure. After the step S203 of FIG. 2, in step S401, a count value Y of the periodic timer set based on the periodic timer duration may be set. Here, the count value Y may be an integer greater than or equal to 1.

In step S402, determine whether the periodic timer times out.

When the periodic timer times out, in step S403, determine whether the count value Y is equal to 1. The timing of the periodic timer continues when the periodic timer does not time out.

When the periodic timer times out and the count value Y is equal to 1, in step S404, a plurality of new authorization durations for a plurality of authorization services are applied.

When the periodic timer times out and the count Y is not equal to 1 (i.e., the count value Y is greater than 1), in step S405, the count value Y is decremented by 1, and in step S406, the periodic timer is restarted, and accordingly, the deciding that whether the periodic timer times out is performed again, that is, the above the steps S402 to S406 are repeated. Here, the steps S405 and S406 may be performed simultaneously or the S406 may be performed before the S405.

Alternatively, the setting the count value for the periodic timer according to the minimum authorization duration and the timer duration for applying for authorization in advance which is set by the user includes: when the minimum authorization duration is greater than the timer duration for applying for authorization in advance which is set by the user, determining an intermediate quantity by dividing the minimum authorization duration by the timer duration for applying for authorization in advance which is set by the user, and setting the count value to a value of the intermediate quantity minus 1 if the intermediate quantity is an integer, otherwise, setting the count value to a value of rounding down the intermediate quantity, and setting the count value to 1 when the minimum authorization duration is less than or equal to the timer duration for applying for authorization in advance which is set by the user.

The determination of the count value is described in detail below with the above example of the determination of the periodic timer duration as an example. It is still assumed that the preset or desired value (that is, the timer duration for applying for authorization in advance which is set by the user) is X (in a unit of days), the minimum authorization duration is A (in a unit of minutes (min)), and the intermediate value is Z, the timing duration F(X) may be determined by equations (2) and (3):

$$Y = \begin{cases} \text{Floor}(Z) & X < A/1440 \text{ and } Z \text{ is not an integer} \\ Z - 1 & X < A/1440 \text{ and } Z \text{ is an integer} \\ 1 & X \geq A/1440 \end{cases} \tag{2}$$

$$Z = \frac{A \times 60 \times 1000}{X \times 24 \times 60 \times 60 \times 1000} = \frac{A}{X \times 1440} \tag{3}$$

According to the equations (2) and (3), when the timer duration for applying for authorization in advance which is set by the user is less than the minimum authorization duration, if the minimum authorization duration is divisible by the timer duration for applying for authorization in advance which is set by the user, a value of division result minus 1 is set as the count value of the periodic timer. As such, it ensures that the periodic timer times out a head of a period of time X before the authorization service with the minimum authorization duration expires, the new authorization durations are applied in advance. When the timer duration for applying for authorization in advance which is set by the user is less than the minimum authorization duration, if the minimum authorization duration is not divisible by the timer duration for applying for authorization in advance which is set by the user, a value that the result is rounded down is set as the count value of the periodic timer. As such, it ensures that the periodic timer times out at least ahead of a period of time before the authorization service with the minimum authorization duration expires, and then the new authorization durations are applied in advance. The timing of the periodic timer is performed only once when the timer duration for applying for authorization in advance which is set by the user is greater than or equal to the minimum authorization duration, and the new authorization durations are applied in advance when the periodic timer set based on the periodic timer duration less than the minimum authorization duration times out.

As such, by the setting of the periodic timer duration less than the minimum authorization duration and the setting of the timing number of the periodic timer, this design mechanism may ensure that the terminal applies for the new authorization durations in advance before any one authorization service expires, so as to avoid the service interruption, improve an interaction efficiency between the terminal and the server, and ensure the quality of the service.

Returning back to FIG. 3, in step S307, the PC3 Link Manager of UE transmits a MO request message to the ProSe Function to apply for new authorization durations. In step S308, the ProSe Function transmits a MO response messages including a plurality of new authorization durations for the plurality of authorization services to the PC3 Link Manager of UE.

Moreover, in FIG. 3, the ProSe Service Manager of UE also always checks the authorization services during the authorization services being provided by the terminal.

As such, determining the timing duration of the timer used to apply for authorization based on the minimum or lowest authorization duration among the plurality of authorization durations can avoid or reduce the frequent interaction problem caused by the plurality of authorization applications, and effectively reduce the data pressure of the network. In addition, by setting of the periodic timer duration and the count value of the periodic timer, the timer implementation of the terminal may be simplified, and it ensures that the continuous availability of the services.

In addition, in the related art, when the periodic timer times out, if the terminal happens to be in a state out of the coverage range (OOC state), the terminal cannot obtain the new authorization durations from a server, that is, the terminal cannot continue to provide the services. If the new authorization durations fail to be acquired, the terminal returns a warning or error message and interrupt the corresponding service, which will cause the service failure due to the authorization failure and reduce the availability of the terminal.

In some example embodiments of the present disclosure, alternatively, timings of the plurality of authorization durations for the plurality of authorization services and a timing of the periodic timer are suspended, when a terminal receiving the service authorizations of the plurality of authorization services switches from a state in a coverage range (IC state) to a state out of the coverage range (OOC state), the timings of the plurality of authorization durations for the plurality of authorization services and the timing of the periodic timer are resumed when the terminal switches from the OOC state to the IC state. In other words, all the timers related to the authorization services are turned off to suspend the timings when the terminal is in the OOC state in which the new authorization durations cannot be applied or received, and all the timers related to the authorization services are turned on to resume the timings when the terminal re-enters the IC state. As such, in a case that the terminal cannot acquire authorizations due to an unstable network and other reasons, the timings of the timers are stopped to avoid or reduce the problem that the terminal still cannot apply for or receive the new authorization durations when an authorization service expires, and the services are interrupted by a poor network environment.

Figure 5:
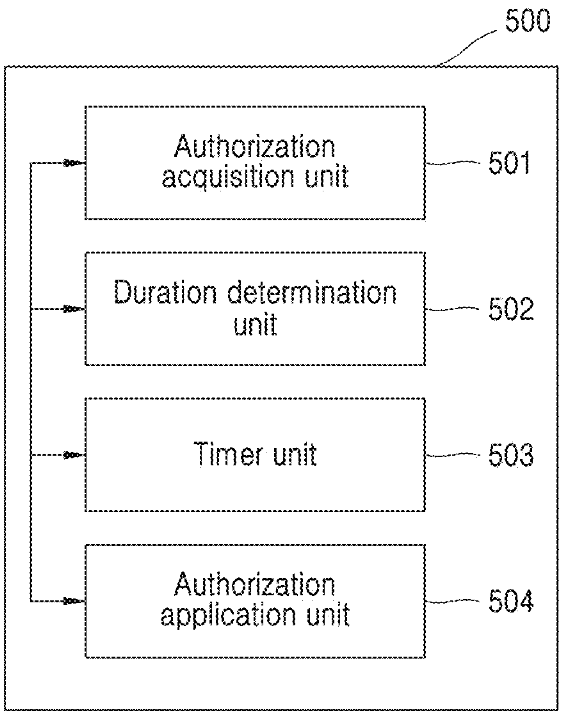
FIG. 5 illustrates a structural block diagram of a terminal of applying for an authorization duration according to some example embodiments of the present disclosure.

FIG. 5 illustrates a structural block diagram of a terminal of applying for an authorization duration according to some example embodiments of the present disclosure.

Referring to FIG. 5, a terminal 500 of applying for an authorization duration according to some example embodiments of the present disclosure include: an authorization acquisition unit 501, a duration determination unit 502, a timer unit 503, and an authorization application unit 504. Specifically, the authorization acquisition unit 501 is configured to acquire a plurality of authorization durations for a plurality of authorization services when service authorizations of the plurality of authorization services are received. The duration determination unit 502 is configured to determine a periodic timer duration for acquiring the plurality of authorization services at one time, based on a minimum authorization duration among the plurality of authorization durations and a timer duration for applying for authorization in advance which is set by a user. The timer unit 503 is configured to start a periodic timer set based on the periodic timer duration. The authorization request unit 504 is configured to apply for a plurality of new authorization durations for the plurality of authorization services in response to a timeout of the periodic timer set based on the periodic timer duration. The terminal 500 of applying for the authorization duration according to some example embodiments of the present disclosure may be a D2D terminal as described above.

In other words, the authorization acquisition unit 501 may perform step the S201 above, the duration determination unit 502 may perform the step S202 above, the timer unit 503 may perform the step S203 above, and the authorization application unit 504 may perform the step S204 above. The details of the operations involved in the above method of applying for the authorization duration can be referred to the descriptions in FIGS. 2 to 5, which will not be described in detail in the following description.

Alternatively, the terminal 500 of applying for the authorization duration according to some example embodiments of the present disclosure may further include an authorization check unit (not shown in FIG. 5). Alternatively, the timer unit 503 is also configured to start timers, which are set based on the plurality of authorization durations respectively, corresponding to the plurality of authorization services while acquiring the plurality of authorization durations, and the authorization check unit is configured to use one or more timers corresponding to one or more services to check whether the one or more services are within the corresponding authorization durations when a service request for the one or more services is received.

Alternatively, the authorization acquisition unit 501, the authorization application unit 504 and the authorization check unit may be included in the PC3 Link Manager of UE, and the duration determination unit 502 and the timer unit 503 may be included in the ProSe Service Manager of UE above.

Alternatively, the duration determination unit 502 is configured to determine the periodic timer duration for acquiring the plurality of authorization services at one time, based on the minimum authorization duration among the plurality of authorization durations and the timer duration for applying for authorization in advance which is set by the user, by: setting the periodic timer duration to the timer duration for applying for authorization in advance which is set by the user, when the minimum authorization duration is greater than the timer duration for applying for authorization in advance which is set by the user; and setting the periodic timer duration to a duration that is less than the minimum authorization duration, determined based on a preset or desired time advance parameter, when the minimum authorization duration is less than or equal to the timer duration for applying for authorization in advance which is set by the user.

Alternatively, the duration that is less than the minimum authorization duration, determined based on the preset or desired time advance parameter is a duration obtained by multiplying the preset or desired time advance parameter with the minimum authorization duration, wherein the preset or desired time advance parameter is a percentage greater than 0 and less than 1.

Alternatively, the authorization application unit 504 is configured to apply for the plurality of new authorization durations for the plurality of authorization services in response to the timeout of the periodic timer set based on the periodic timer duration, by: setting a count value for the periodic timer according to the minimum authorization duration and the timer duration for applying for authorization in advance which is set by the user; deciding whether the periodic timer times out; determining whether the count value is equal to 1 in response to the timeout of the periodic timer set based on the periodic timer duration; applying for the plurality of new authorization durations for the plurality of authorization services when the count value is equal to 1; decreasing the count value by 1, restarting the periodic timer, and performing the deciding, when the count value is not equal to 1.

Alternatively, the authorization application unit 504 is configured to set the count value for the periodic timer according to the minimum authorization duration and the timer duration of (or for) applying for authorization in advance which is set by the user, by: when the minimum authorization duration is greater than the timer duration for applying for authorization in advance which is set by the user, determining an intermediate quantity by dividing the minimum authorization duration by the timer duration for applying for authorization in advance which is set by the user, and setting the count value to a value of the intermediate quantity minus 1 if the intermediate quantity is an integer, otherwise, setting the count value to a value of rounding down the intermediate quantity, and setting the count value to 1 when the minimum authorization duration is less than or equal to the timer duration for applying for authorization in advance which is set by the user.

Alternatively, the timer unit 503 is also configured to suspend timings of the plurality of authorization durations for the plurality of authorization services and a timing of the periodic timer, when the terminal 500 switches from a state in a coverage range (IC state) to a state out of the coverage range (OOC state), and resume the timings of the plurality of authorization durations for the plurality of authorization services and the timing of the periodic timer when the terminal 500 switches from the OOC state to the IC state.

With respect to the terminal 500 of the authorization application in the above example embodiment, the specific manners in which each unit performs the operations has been described in detail in some example embodiments of the related method, and will not be described in detail here.

In addition, it should be understood that each unit in the terminal 500 of the authorization application according to some example embodiments of the present disclosure may be implemented as a hardware component and/or a software component. Those skilled in the art may, for example, use a field programmable gate array (FPGA) or an application specific integrated circuit (ASIC) to implement each unit according to the defined processing performed by each unit.

According to some example embodiments of the present disclosure, a computer equipment is further provided. The computer equipment include: at least one processor; and at least one memory storing computer executable instructions. The computer executable instructions, when being executed by the at least one processor, cause the at least one processor to perform the method of applying for an authorization duration as described in the above example embodiments.

As an example, the computer equipment may be a PC computer, a tablet device, a personal digital assistant, a smartphone, or other devices capable of executing the above set of instructions. Here, the computer equipment does not have to be a single electronic device, but may also be an assembly of any device or circuit that may execute the above instructions (or instruction sets) individually or jointly. The computer equipment may also be a part of an integrated control system or system manager, or may be configured as a portable electronic device that is interfaced with a local or remote (e.g., via wireless transmission).

In computer equipment, the processor may include a central processing unit (CPU), a graphics processor (GPU), a programmable logic device, a dedicated processor system, a microcontroller or a microprocessor. As an example, but not a limitation, the processor may also include an analog processor, a digital processor, a microprocessor, a multi-core processor, a processor array, a network processor, and the like.

The processor may run instructions or codes stored in the memory, which may also store data.

According to some example embodiments of the present disclosure, a computer-readable storage medium is further provided. Instructions in the computer-readable storage medium, when being executed by at least one processor, cause the at least one processor to perform the method of applying for an authorization duration as described in the above example embodiments.

Examples of the computer-readable storage medium here include: a read only memory (ROM), a random access programmable read only memory (PROM), an electrically erasable programmable read only memory (EEPROM), a random access memory (RAM), dynamic random access memory (DRAM), a static random access memory (SRAM), a flash memory, a non-volatile memory, a CD-ROM, a CD-R, a CD+R, a CD-RW, a CD+RW, a DVD-ROM, a DVD-R, a DVD+R, a DVD-RW, a DVD+RW, a DVD-RAM, a BD-ROM, a BD-R, a BD-R LTH, a BD-RE, a Blu-ray or an optical disc storage, a hard disk drive (HDD), a solid state hard disk (SSD), a card memory (such as a multimedia card, a secure digital (SD) card, or an extreme digital (XD) card), a magnetic tape, a floppy disk, a magneto-optical data storage device, an optical data storage device, a hard disk, a solid state disk, and any other devices configured to store computer applications and any associated data, data files and data structures in a non-transitory manner, and provide the computer applications and any associated data, data files and data structures to a processor or computer so that the processor or computer can execute the computer applications. The computer applications in the above-mentioned computer readable storage medium can be executed in an environment deployed in a computer device such as a client, a host, a proxy device, a server, etc. in addition, in one example, the computer applications and any associated data, data files and data structures are distributed over networked computer systems so that the computer applications and any associated data, data files and data structures are stored, accessed and executed in a distributed manner by one or more processors or computers.

According to some example embodiments of the present disclosure, a computer software may also be provided, and instructions in the computer software may be executed by at least one processor to implement the method of applying for the authorization duration as described in the above example embodiments.

After considering the description and practicing the present invention disclosed herein, those skilled in the art are easily think of other example embodiments of the present disclosure. The present application intends to cover any variation, use or adaptation of the present disclosure, which follow general principles of the present disclosure and include the common general knowledge or frequently used technical means in the technical field, which are not disclosed in the present disclosure. The description and the above-described example embodiments are only regarded as examples, and the true scope and spirit of the present disclosure are indicated by the claims.

Any of the elements and/or functional blocks disclosed above may include or be implemented in processing circuitry such as hardware including logic circuits; a hardware/software combination such as a processor executing software; or a combination thereof. For example, the authorization acquisition unit 501, duration determination unit 502, timer unit 503, and authorization application unit 504 may be implemented as processing circuitry. The processing circuitry specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

Processor(s), controller(s), and/or processing circuitry may be configured to perform actions or steps by being specifically programmed to perform those action or steps (such as with an FPGA or ASIC) or may be configured to perform actions or steps by executing instructions received from a memory, or a combination thereof.

It should be understood that the present disclosure is not limited to the precise structure described above and shown in the drawings, and various modifications and changes may be made without departing from its scope. The scope of the present disclosure is limited only by the claims.

What is claimed is:

1. A method of applying for an authorization duration, the method comprising:

acquiring a plurality of authorization durations for a plurality of authorization services in response to service authorizations of the plurality of authorization services being received;

determining a periodic timer duration for acquiring the plurality of authorization services at one time based on a minimum or lowest authorization duration among the plurality of authorization durations and a timer duration for applying for authorization in advance, the timer duration for applying for authorization in advance being set by a user;

starting a periodic timer based on the periodic timer duration; and applying for a plurality of new authorization durations for the plurality of authorization services in response to a timeout of the periodic timer, wherein, the determining the periodic timer duration for acquiring the plurality of authorization services at one time, based on the minimum or lowest authorization duration among the plurality of authorization durations and the timer duration for applying for authorization in advance comprises setting the periodic timer duration to the timer duration for applying for authorization in advance, when the minimum or lowest authorization duration is greater than the timer duration for applying for authorization in advance; and setting the periodic timer duration to a duration that is less than the minimum or lowest authorization duration, determined based on a first time advance parameter, when the minimum or lowest authorization duration is less than or equal to the timer duration for applying for authorization in advance.

2. The method of claim 1, wherein the duration that is less than the minimum or lowest authorization duration, determined based on the first time advance parameter is a duration obtained by multiplying the first time advance parameter with the minimum or lowest authorization duration, wherein the first time advance parameter is a percentage greater than 0 and less than 1.

3. The method of claim 1, wherein, the applying for the plurality of new authorization durations for the plurality of authorization services in response to the timeout of the periodic timer comprises:

setting a count value for the periodic timer according to the minimum or lowest authorization duration and the timer duration for applying for authorization in advance;

deciding whether the periodic timer times out, determining whether the count value is equal to 1 in response to the timeout of the periodic timer;

applying for the plurality of new authorization durations for the plurality of authorization services in response to the count value being equal to 1; and decreasing the count value by 1, restarting the periodic timer, and performing the deciding, in response to the count value not being equal to 1.

4. The method of claim 3, wherein, the setting the count value for the periodic timer according to the minimum or lowest authorization duration and the timer duration for applying for authorization in advance comprises:

in response to the minimum or lowest authorization duration being greater than the timer duration for applying for authorization in advance, determining an intermediate quantity by dividing the minimum or lowest authorization duration by the timer duration for applying for authorization in advance, and setting the count value to a value of the intermediate quantity minus 1 if the intermediate quantity is an integer, otherwise, setting the count value to a value of rounding down the intermediate quantity; and setting the count value to 1 when the minimum or lowest authorization duration is less than or equal to the timer duration for applying for authorization in advance.

5. The method of claim 1, further comprising:

suspending timings of the plurality of authorization durations for the plurality of authorization services and a timing of the periodic timer, in response to a terminal receiving the service authorizations of the plurality of authorization services switches from a state in a coverage range (IC state) to a state out of the coverage range (OOC state); and resuming the timings of the plurality of authorization durations for the plurality of authorization services and the timing of the periodic timer in response to the terminal switching from the OOC state to the IC state.

6. The method of claim 1, further comprising:

starting timers corresponding to the plurality of authorization services while acquiring the plurality of authorization durations, the timers being set based on the plurality of authorization durations respectively; and using one or more timers among the timers corresponding to one or more services to check whether the one or more services are within the corresponding authorization durations in response to a service request for the one or more services being received.

7. A terminal configured to apply for an authorization duration, the terminal comprising:

at least one processor; and at least one memory storing computer executable instructions, wherein the at least one processor is configured to execute the computer executable instructions to cause the terminal to acquire a plurality of authorization durations for a plurality of authorization services in response to service authorizations of the plurality of authorization services being received;

determine a periodic timer duration for acquiring the plurality of authorization services at one time, based on a minimum or lowest authorization duration among the plurality of authorization durations and a timer duration for applying for authorization in advance, the timer duration for applying for authorization being set by a user;

start a periodic timer set based on the periodic timer duration; and apply for a plurality of new authorization durations for the plurality of authorization services in response to a timeout of the periodic timer, wherein the at least one processor in response to executing the computer executable instructions causes the terminal to determine the periodic timer duration for acquiring the plurality of authorization services at one time based on the minimum or lowest authorization duration among the plurality of authorization durations and the timer duration for applying for authorization in advance, by setting the periodic timer duration to the timer duration for applying for authorization in advance, in response to the minimum or lowest authorization duration being greater than the timer duration for applying for authorization in advance, and setting the periodic timer duration to a duration that is less than the minimum or lowest authorization duration, determined based on a first time advance parameter, in response to the minimum or lowest authorization duration being less than or equal to the timer duration for applying for authorization in advance.

8. The terminal of claim 7, wherein the duration that is less than the minimum or lowest authorization duration, determined based on the first time advance parameter is a duration obtained by multiplying the first time advance parameter with the minimum or lowest authorization duration, wherein the first time advance parameter is a percentage greater than 0 and less than 1.

9. The terminal of claim 7, wherein the at least one processor in response to executing the computer executable instructions causes the terminal to apply for the plurality of new authorization durations for the plurality of authorization services in response to the timeout of the periodic timer, by setting a count value for the periodic timer according to the minimum or lowest authorization duration and the timer duration for applying for authorization in advance, deciding whether the periodic timer times out, determining whether the count value is equal to 1 in response to the timeout of the periodic timer, applying for the plurality of new authorization durations for the plurality of authorization services in response to the count value being equal to 1, and decreasing the count value by 1, restarting the periodic timer, and performing the deciding, in response to the count value not being equal to 1.

10. The terminal of claim 9, wherein the at least one processor in response to executing the computer executable instructions causes the terminal to set the count value for the periodic timer according to the minimum or lowest authorization duration and the timer duration for applying for authorization in advance, by in response to the minimum or lowest authorization duration being greater than the timer duration for applying for authorization in advance, determining an intermediate quantity by dividing the minimum or lowest authorization duration by the timer duration for applying for authorization in advance, and setting the count value to a value of the intermediate quantity minus 1 if the intermediate quantity is an integer, otherwise, setting the count value to a value of rounding down the intermediate quantity; and setting the count value to 1 in response to the minimum or lowest authorization duration being less than or equal to the timer duration for applying for authorization in advance.

11. The terminal of claim 7, wherein the at least one processor in response to executing the computer executable instructions causes the terminal to suspend timings of the plurality of authorization durations for the plurality of authorization services and a timing of the periodic timer, in response to the terminal receiving the service authorizations of the plurality of authorization services switches from a state in a coverage range (IC state) to a state out of the coverage range (OOC state), and resume the timings of the plurality of authorization durations for the plurality of authorization services and the timing of the periodic timer in response to the terminal switching from the OOC state to the IC state.

12. The terminal of claim 7, wherein the at least one processor in response to executing the computer executable instructions causes the terminal to start timers corresponding to the plurality of authorization services while acquiring the plurality of authorization durations, the timers being set based on the plurality of authorization durations respectively, and use one or more timers among the timers corresponding to one or more services to check whether the one or more services are within the corresponding authorization durations in response to a service request for the one or more services being received.

13. A non-transitory computer-readable storage medium storing instructions that, when executed by at least one processor, cause the at least one processor to perform:

acquiring a plurality of authorization durations for a plurality of authorization services in response to service authorizations of the plurality of authorization services being received;

determining a periodic timer duration for acquiring the plurality of authorization services at one time based on a minimum or lowest authorization duration among the plurality of authorization durations and a timer duration for applying for authorization in advance, the timer duration for applying for authorization in advance being set by a user;

starting a periodic timer based on the periodic timer duration; and applying for a plurality of new authorization durations for the plurality of authorization services in response to a timeout of the periodic timer, wherein the at least one processor in response to executing the instructions causes the at least one processor to determine the periodic timer duration for acquiring the plurality of authorization services at one time based on the minimum or lowest authorization duration among the plurality of authorization durations and the timer duration for applying for authorization in advance, by setting the periodic timer duration to the timer duration for applying for authorization in advance, in response to the minimum or lowest authorization duration being greater than the timer duration for applying for authorization in advance, and setting the periodic timer duration to a duration that is less than the minimum or lowest authorization duration, determined based on a first time advance parameter, in response to the minimum or lowest authorization duration being less than or equal to the timer duration for applying for authorization in advance.

* * * * *